United States Patent
Twardowska et al.

(10) Patent No.: US 12,018,112 B2
(45) Date of Patent: Jun. 25, 2024

(54) CATALYST FOR EXTENDED WORK TIME FILLER COMPOSITION

(71) Applicant: Illinois Tool Works Inc., Glenview, IL (US)

(72) Inventors: Helena Twardowska, Glenview, IL (US); Carlton Seaboldt, Glenview, IL (US); Grant Shouldice, Glenview, IL (US); Rick Turpin, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 312 days.

(21) Appl. No.: 17/591,873

(22) Filed: Feb. 3, 2022

(65) Prior Publication Data

US 2022/0289874 A1 Sep. 15, 2022

Related U.S. Application Data

(60) Provisional application No. 63/160,993, filed on Mar. 15, 2021.

(51) Int. Cl.

| | |
|---|---|
| *C08F 4/34* | (2006.01) |
| *B29C 73/16* | (2006.01) |
| *C08K 3/36* | (2006.01) |
| *C08K 5/08* | (2006.01) |
| *C09D 5/34* | (2006.01) |
| *C09D 7/20* | (2018.01) |
| *C09D 7/61* | (2018.01) |
| *C09D 7/63* | (2018.01) |
| *C08K 3/22* | (2006.01) |

(52) U.S. Cl.
CPC .............. *C08F 4/34* (2013.01); *B29C 73/166* (2013.01); *C08K 3/36* (2013.01); *C08K 5/08* (2013.01); *C08F 2410/01* (2013.01); *C08K 2003/2241* (2013.01)

(58) Field of Classification Search
CPC .............. C09D 5/34; C09D 7/20; C09D 7/61; C09D 7/63; C08F 4/34
See application file for complete search history.

(56) References Cited

U.S. PATENT DOCUMENTS

| | | | |
|---|---|---|---|
| 4,142,038 A | 2/1979 | Kraft | |
| 4,421,879 A | 12/1983 | Eimers et al. | |
| 5,684,202 A | 11/1997 | Meier et al. | |
| 2018/0163102 A1* | 6/2018 | Twardowska | ............ B05D 7/14 |

FOREIGN PATENT DOCUMENTS

WO 2018111757 A1 6/2018

OTHER PUBLICATIONS

European Search Report issued in European Patent Appln. No. 22160349, issued Jul. 22, 2022.

* cited by examiner

*Primary Examiner* — Catherine S Branch
(74) *Attorney, Agent, or Firm* — MaxGoLaw PLLC

(57) ABSTRACT

A free radical cure catalyst composition is provided that includes a free radical cure catalyst present as a paste at 20° C. A cure inhibitor is dissolved in a solvent compatible with the free radical cure catalyst paste to form an inhibitor solution that is mixed into the paste. A filler composition is also provided that includes an ethylenically unsaturated resin, a crosslinking agent; and the free radical cure catalyst composition. A method of repairing a vehicle body is provided that includes an uncured layer of the composition as noted above is applied to a substrate. The uncured layer is modified during a working time of from 8 to 35 minutes. The uncured layer is allowed to cure under free radical conditions to form a cured layer.

20 Claims, No Drawings

CATALYST FOR EXTENDED WORK TIME FILLER COMPOSITION

RELATED APPLICATIONS

This application is a non-provisional application that claims priority benefit of U.S. Provisional Application Ser. No. 63/160,993 filed on Mar. 15, 2021; the contents of which are hereby incorporated by reference.

FIELD OF THE INVENTION

The present invention in general relates to ethylenically unsaturated filler composition, and in particular to a filler composition with a work time of from 8 to 35 minutes through resort to a new catalyst composition inclusive of inhibitor.

BACKGROUND OF THE INVENTION

Filler compositions are used in the vehicle repair aftermarket industry to repair of deformities such as holes and dents in vehicle bodies. The filler composition cures following application to the deformity and upon reaching a level of hardness, the resulting coating overlying the defect is sanded and finished with suitable painting steps to affect the repair of the vehicle body.

Conventional filler compositions represent a balance of properties to allow sufficient working time to shape the composition into a desired surface contour relative to the properties of the cured filler. In this context, it is conventional to utilize two-part curable resin systems in this context in which a mixture of a base and a curing agent initiates cure and the onset of working time. The curing time is controlled to a certain extent by the ratio of curing agent to reactive moieties, but this is not a simple proportionality since it is influenced by conditions such as temperature, applied composition thickness, and humidity. Generally, working time to apply a composition controls and too rapid a viscosity increase in a material being applied requires the repair or material application to be repeated Currently, work time is controlled through the addition of a separate inhibitor and/or promoter package to the filler composition. This inhibitor and/or promoter package moderates the cure kinetics associated with ground solid peroxide type cure catalyst. It is conventional to provide a 50 percent by weight solid benzoyl peroxide (BPO) paste at a weight ratio of filler composition to BPO of 50:1 ratio that equates to approximately 2 total weight percent of BPO paste and additional weight percent of inhibitor and/or promoter package is then added resulting in a net larger total percentage of catalyst and moderating package thereby complicating formulation by adjusting the relative amounts of other components to compensate for the variably amount of package present. The disadvantage of this approach is sensitivity of the work time to the amount of BPO. The concentration of package in filler is usually high and system requires minimum amounts of BPO to cure efficiently. In addition, the inhibitor and/or promoter package adds cost and complicates the cure kinetics profile. As a result, when a BPO catalyst is present below about this 2 total weight percent amount or cure is attempted at low temperatures of between −5 and 10° C. poor application characteristics are often observed, such as tacky surface after cure, poor adhesion, difficulty in sanding to a feather edge.

Thus, there further exists a need for a free radical catalyst composition that provides of longer work times than is conventionally possible and with less than concentration dependency. There is a need for body repair system that shows consistently good application performance at different application conditions and with work times of between 8 and 35 minutes. Improvements result in the fields of transportation uses such as train cars, and truck cab; and commercial fillers.

SUMMARY OF THE INVENTION

A free radical cure catalyst composition is provided that includes a free radical cure catalyst present as a powdered solid at 20° C. A cure inhibitor is dissolved in a solvent compatible with the free radical cure catalyst to form an inhibitor solution that is mixed with the powdered solid.

A filler composition is also provided that includes an ethylenically unsaturated resin, a crosslinking agent; and the free radical cure catalyst composition.

A method of repairing a vehicle body is provided that includes an uncured layer of the composition as noted above is applied to a substrate. The uncured layer is modified during a working time of from 8 to 35 minutes. The uncured layer is allowed to cure under free radical conditions to form a cured layer.

DETAILED DESCRIPTION OF THE PREFERRED EMBODIMENTS

The present invention has utility as a free radical cure catalyst composition that includes a cure inhibitor intermixed with a solid free radical cure catalyst. Compositions are provided for a filler composition, as might be used in vehicle body repair through resort to an inventive free radical cure catalyst composition. Based on the filler content and coating thickness, these inventive compositions function as primers, putties, and fillers. Embodiments of the inventive compositions provide a longer work time than conventional BPO cured compositions and more predictable work time under a variety of temperature conditions than conventional compositions. As a result, the applied composition can be corrected or reworked unlike a conventional two-part BPO catalyzed repair system. This is achieved through addition of a novel catalyst material inclusive a cure inhibitor.

The invention uses a novel free radical cure catalyst composition that contains both solid free radical cure catalyst which generates radicals that are required to cure ethylenically unsaturated resins and inhibitors mixed therein that react with the generated radicals operating synergistically to maintain desired balance manifest as an extended work time of from 8 to 35 minutes. The present invention has reduced sensitivity to the amount of catalyst present relative to convention catalysts and allows a technician to use the same filler for different applications and at different environmental conditions. The resulting inventive compositions have work times of from 8 to 35 minutes, and have suitable characteristics as to flexibility, tack-free surface and fire retardance.

As used herein, "sandable" with reference of a cured inventive composition is defined as having limited clogging of sandpaper and able to form a featheredge.

As used herein, "benzoyl peroxide" is used synonymously with dibenzoyl peroxide (CAS 94-36-0) and abbreviated herein as BPO.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

A free radical cure catalyst is also present. Exemplary free radical cure catalysts operative herein illustratively include diacylperoxides, hydroperoxides, ketone peroxides, peroxyesters, peroxyketals, dialkyl peroxides, alkyl peresters and percarbonates. Azo-type catalysts operative herein illustratively include azobisisobutyronitrile (AIBN). In some inventive embodiments, the catalyst is present as a paste, alone or combination with an aqueous slurry. An aqueous slurry illustratively includes a plasticizer, a stearate, fumed silica, or a combination thereof. Benzoyl peroxide (BPO) and di(4-tert.butylcyclohexyl)peroxydicarbonate are specific examples of powdered free-radical cure catalysts operative herein and commercially available at 50 to 60 weight percent with an aqueous slurry of components such as a plasticizer, a stearate, fumed silica, or a combination thereof representing the remainder to the catalyst composition. In some other inventive embodiments, the free radical cure catalyst is present from 45 to 70 weight percent of a paste alone or in an aqueous slurry that illustratively includes a plasticizer, a stearate, fumed silica, or a combination thereof; and without inclusion of cure inhibitor or solvents in which the cure inhibitor is dissolved. Typically, the free radical cure catalyst paste alone or in combination with the slurry are present at from 0.5 to 5 total weight percent. At 2 total weight percent, the catalyst composition is present at a weight ratio of 1:50 relative to the remainder of the composition.

According to the present invention, a new catalyst composition is prepared by adding inhibitor solution to free radical cure catalyst, or the free radical cure catalyst with a slurry. The process for preparation of a new catalyst composition involves dissolving an inhibitor in solvent compatible with the free radical cure catalyst paste and slurry, if present. In some inventive embodiments, the inhibitor is dissolved in a solvent in which the inhibitor is very soluble to limit the volume of inhibitor solution. In still other embodiments, the inhibitor is to obtain a stable concentration within 95% of solvent saturation limit at 20° C. The inhibitor solution is then mixed with the free radical cure catalyst alone and slurry, if present to obtain the inventive new catalyst composition.

Solvents in which inhibitors are soluble are well-known in the art and illustratively include $C_2$-$C_6$ alcohols, dimethylsulfoxide, acetone, toluene, dimethyl formamide, propylene glycol, polypropylene glycol, propylene glycol monomethyl ether acetate, mineral spirits, heptane, odorless mineral spirits, and miscible combinations thereof and depending on specific solubility of the inhibitor selected.

An inhibitor operative in the present invention has the attribute of quenching free radicals and as a result function to form stable chain terminating moieties. An inhibitor is synonymously referred to herein as an antioxidant. Inhibitors operative herein include quinones, substituted phenols, secondary aromatic amines, lactones, and combinations thereof. Specific inhibitors operative herein include mono-tert-butylhydroquinone (MTBHQ), 2,5-di-tert-butylhydroquinone (DTBHQ), butylated hydroxytoluene (BHT), toluhydroquinone (THQ), trimethyl hydroquinone (TMHQ), butylated hydroxyanisole (BHA), 4-methoxyphenol (MEHQ), hydroxyamines, benzofuranone derivatives, vitamin E, and combinations thereof. Important factors in selecting an inhibitor illustratively include solubility in a solvent that is compatible with free radical cure catalyst and the slurry, if present; stability in the presence of free radical cure catalyst and a slurry, if present at room temperature of 20° C.; and stability in the presence of free radical cure catalyst and a slurry, if present at an elevated temperature of 40° C. While most stability and work time testing detailed herein for inventive compositions is 20° C. and 40° C., the operating temperature range of inventive compositions range from −5° C. to 60° C. Typical loadings of cure inhibitor in catalyst composition are from 0.5 to 5 weight percent, and from 200 to 800 ppm in a fully formulated repair composition. Mixtures of inhibitors can also be used, frequently resulting in better stability and work time control.

The new catalyst composition through selection of free radical catalyst identity, amount of free radical catalyst, inhibitor identity, and amount of inhibitor allows one to achieve work times for specific filler compositions that have work times at room temperature and elevated temperature within the range of 8 to 35 minutes. This inventive attribute is especially important for large area applications, such as those found in commercial, transportation, and restoration. The new catalyst compositions reduce sensitivity of work time to the exact amount of free radical catalyst present, as is the case in conventional formulations. The new catalyst compositions when present also render a filler compositions less prone to variations in work time under varying repair conditions, especially temperature compared to conventional filler compositions. It is appreciated that new catalyst compositions function in place of all or part of a conventional free radical catalyst paste and aqueous slurry, if present; or in addition to a conventional free radical catalyst paste and aqueous slurry, if present so as to provide a range of options to adjust work time of a filler composition.

A curable resin is present in an inventive composition in the form of a polyester resin; however, it is appreciated that other free radical curable compositions operative herein illustratively include acrylics, vinyl esters, and combinations thereof. The free radical curable resin is modified with specialized additives to control the free-radical polymerization so as to minimize cure reaction exotherm and shrinkage. To further maximize the resulting cured polyester composite toughness and adhesion, in some inventive embodiments, a thermoplastic filler also incorporated.

An inventive unsaturated polyester resin has a degree of ethylenic unsaturation that is between 20 and 100% of the non-alcoholic monomer in the polyester resin and denotes reactivity within the polyester resin backbone to free radical polymerization. The unsaturation in a polyester backbone is reactive with vinyl and allyl moieties of a styrenic or non-styrenic molecule through free-radical polymerization.

In some embodiments, an inventive unsaturated polyester resin is terminally functionalized with molecules illustratively including allyl glycidyl ether, glycidyl methacrylate, trimethylolpropane diallyl ether, allyl pentaerythritol or polymeric allyl glycidyl ether.

An inventive unsaturated polyester is readily formed in a single reaction or in multi-stage reactions. Typical reaction temperatures range from 130-240° C. A conventional esterification catalyst is present and illustratively includes acids, transition metal catalysts and organo-tin compounds. Typical catalyst loadings range from 0.01 to 1 total weight percent of the reactants.

Reactive polyester resins used in inventive composition have a weight average molecular average weight ranging from 5,000 to 600,000. For purposes of calculating monomer percent, reactive diluents are omitted.

To form an inventive composition, the resulting reactive polyester resin is dissolved in a reactive diluent. Reactive diluents operative herein include acrylics, acrylates, and methacrylates such as methyl methacrylate, butyl acrylate, ethyl-hexyl acrylate, hydroxpropyl methacrylate, hydroxethyl methacrylate, lauryl acrylate, stearyl methacrylate, lauryl methacrylate, butanediol diacrylate, ethyleneglycol dimethacrylate, ethyleneglycol-DCPD methacrylate, ethyl (meth)acrylate and n- and isobutyl(meth)acrylate, cyclohexyl(meth)acrylate, isobornyl(meth)acrylate, benzyl(meth)acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, or DCPD diacrylate; ether monomers of the structure ($C_1$-$C_6$ alkyl)-O—($C_2$-$C_6$ alkylene) such as ethyl vinyl ether, or methyl vinyl; styrene, α-methylstyrene, vinyl toluene, di-functional styrene, allyl substituted benzene, di-vinyl benzene, di- and trifunctional acrylates (commercially available for example as SARTOMER® and MIRAMAR® products), acrylonitrile, mono-vinyl-terminated polydimethylsiloxanes, and combinations of any of the aforementioned. It should be appreciated that a phenyl ring having two moieties in the aforementioned list is intended to include ortho isomers, para isomers, meta isomers, and isomeric mixtures of each.

A crosslinking agent that is multifunctional is also present in some embodiments of an inventive composition. As used herein, multifunctional is defined as a compound that has a polymerizable functionality of at least 2. Difunctional crosslinking agents are particularly well suited for use in the present invention. Crosslinking agents operative in the present invention illustratively include styrene, vinyl toluene, diallyl fumarate, diallyl diglycol carbonate, allyl methacrylate, isobornyl acrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-hexadiene, 1,6-hexanediol diacrylate, 1,6-hexanediol dimethacrylate, N,N'-methylenebismethacrylamide, 1,9-nonanediol dimethacrylate, pentaerythritol tetraacrylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, dipropylene glycol diacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl)phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl] isophthalate, bis[4-(vinyloxymethyl)cyclohexylmethyl]glutarate, bis [-(vinyloxy)butyl]succinate, bis((4-((-vinyloxy) methyl)cyclohexyl)methyl)isophthalate, bis(4-(vinyloxy) butyl)terephthalate, bis[[(4-[vinyloxy)methyl)cyclohexyl] methyl]terephthalate, bis [4-vinyloxy)butyl]adipate, bis [4-(vinyloxy)butyl](methylenedi-1,4-phenylene)biscarbamate, bis-[4-(vinyloxy)butyl](4-methyl-1,3-phenylene)biscarbamate, bis [4-(vinyloxy)butyl]1,6-hexanediylbiscarbamate, tris [4-(vinyloxy)butyl]trimellitate or combinations thereof.

It is appreciated that a minority amount of trifunctional or higher functional crosslinking agent present modifies the cured coating properties.

In some inventive embodiments, the weight ratio of the new catalyst composition is retained relative to the free radical cure catalyst, alone or with the aqueous slurry. By way of example, the 1:50 ratio would be maintained for the new catalyst composition relative to the to the remainder of the composition yet includes inhibitor solution therein to limit the amount of reformulation that is needed to extend the work time for an otherwise conventional composition.

A cure promoter is present from 0 to 5 total weight percent. In the reaction, the cure promoter, donates free hydrogen and can also consume a certain amount of oxygen. Cure promoters operative herein include tertiary amines, beta-ketoamines, methylene groups adjacent to oxygen of an epoxide group, and polyethers, the aforementioned miscible and compatible with the crosslinking agent. Specific chemical initiators operative herein include N,N-Bis(2-hydroxyethyl)-p-toluidine, 2-ethylhexyl-4-dimethylaminobenzoate, ethyl-4-dimethylaminobenzoate, 3,3'-dimethyl-methylenedi(cyclohexylamine), Lasalocid A; and combinations thereof.

Several additives are readily included in an inventive formulation that illustratively include light and heat stabilizers to maintain clarity of the cured adhesives, adhesion promoters, flow control additives, pigments and dyes and combinations thereof. Generally, each of the aforementioned additives is independently present from 0.5 to 5 total weight percent.

Filler particulates or fibers operative in the present invention illustratively include talc, alumina trihydrate, calcium sulfate, calcium carbonate, magnesium sulfate, magnesium carbonate, barium sulfate, microspheroids and the like. A filler is present from 0 to remainder total weight percent of a complete formulation for application to a substrate, with a typical upper limit being 60 total weight percent. It is appreciated that a pigment and filler can have the same function and in those instances where both are present in a formulation, the amounts of both are cumulative.

As used herein a microspheroid is defined to include a hollow microsphere or a solid bead having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass. A microspheroid typically has a longest linear dimension of between 20 and 100 microns to improve sandability and reduce density.

Table 1 lists the major components of an embodiment of the inventive curable composition.

TABLE 1

Formulation of a BPO curable vehicle body repair composition

| Ingredient | Typical Total Weight Percent | Preferred Total Weight Percent |
|---|---|---|
| Curable resin | 10-55 | 15-35 |
| Crosslinking monomer | 10-35 | 15-25 |
| Cure promoter | 0-5 | 0.1-0.9 |
| Combined free radical catalyst mixed with cure inhibitor | 0.5-5 | 1-3 |
| Additives | Each: 0.5-5 | Each: 1-3 |
| Filler | Remainder | Remainder |

The present invention is further detailed with respect to the following non limiting examples. These examples are not intended to limit the scope of the invention but rather highlight properties of specific inventive embodiments and the superior performance thereof relative to comparative examples.

EXAMPLES

Examples 1-5

Commercial premium filler composition, Rage Optex (EVERCOAT®, Cincinnati, OH, USA) is used as a base and contains 2 total weight percent of 50 percent by weight BPO paste as a dispersed powder in an aqueous slurry per Table 5, designated as B50 hereafter. This serves as the Comparative Example hereafter. The catalyst of the Comparative example is reformulated with the conventional free radical catalyst replaced with a 55 percent by weight BPO in a like slurry, designated B55 hereafter, as a dispersed powder to account for the weight contribution of the saturating inhibitor of Examples 1-5, the new catalyst composition being present at 2 total weight percent.

The catalyst compositions are tested shortly after preparation at 20° C., then stored at room temperature for 30 days and then at elevated temperature (40° C.) for 20 days and retested. Results are summarized in Table 1.

TABLE 2

Work time and stability of Comparative Example and Examples 1-5.

| Catalyst | Catalyst Composition | Work Time Initial (min) | Work Time 30 days RT (min) | Work Time 20 days 105F (min) |
|---|---|---|---|---|
| Comparative (C) | B50 | 4 | 4 | 4.5 |
| Ex. 1 | B55 + 4.5% MTBHQ sol in PPG* (25%)** | 12 | 12 | 11 |
| Ex. 2 | B55 + 11% MTBHQ sol in PPG (25%) | 31 | 29.5 | 29 |
| Ex. 3 | B55 + 11.5% BHT sol in heptane (40%) | 31.5 | 31 | 19 |

TABLE 2-continued

Work time and stability of Comparative Example and Examples 1-5.

| Catalyst | Catalyst Composition | Work Time Initial (min) | Work Time 30 days RT (min) | Work Time 20 days 105F (min) |
|---|---|---|---|---|
| Ex. 4 | B55 + 11% DTBHQ sol in PG (20%) | 6 | NA | NA |
| Ex. 5 | B55 + 9% THQ sol in PMAc† (25%) | 28 | 19 | NA |

*PPG denotes polypropylene glycol
**parenthetical percentage is amount of inhibitor as a weight percentage dissolved in the solvent.
†PMAc denotes propylene glycol monomethyl ether acetate Several new catalyst compositions are tested for application performance on hot deep galvanized steel using standard procedures. The results are summarized in Tables 3 and 4 and show good repair performance in terms of work time control, adhesion and sandability.

TABLE 1

Composition and Stability of New Catalysts.

| Catalyst | Catalyst Composition | Work Time Initial (min) | Work Time 30 days RT (min) | Work Time 20 days 105F (min) |
|---|---|---|---|---|
| Benox B50 (Fast) | Currently used | 4 | 4 | 4.5 |
| New Medium | B50 + 4.5% MTBHQ sol in PPG (25%) | 12 | 12 | 11 |
| New Slow 1 | B55 + 11% MTBHQ sol in PPG (25%) | 31 | 29.5 | 29 |
| New Slow 2 | B55 + 11.5% BHT sol in heptane (40%) | 31.5 | 31 | 19 |
| New Slow 3 | B55 + 11% DTBHQ sol in PG (20%) | 6 | NA | NA |
| New Slow 4 | B55 + 9% THQ sol in PMAc (25%) | 28 | 19 | NA |

TABLE 3

Application performance with comparative composition (C) and new catalyst compositions (Examples 1 and 2) at 20° C. at 32% relative humidity (RH) on hot dipped galvanized steel for various total weight percentages of catalyst compositions are provided. "Surf" denotes surface and "Adh" denotes adhesion in the following tables.

| Ex. | Additives relative to Comp. Ex. (C) | Amnt. of Catalyst (%) | Work Time (min) | Dry to sand (min) | Sand Quality on Surf. | Surface Clogging | Sand Quali. Below Surf. | Clog Below Surf. | Feather edge | Adh. |
|---|---|---|---|---|---|---|---|---|---|---|
| C |  | 1 | 7 | 40 | 7.5 | 8 | 8.5 | 9 | 8 | 9 |
| C |  | 2 | 4.5 | 20 | 7.5 | 8 | 8.5 | 9 | 8 | 9 |
| C |  | 3 | 3.5 | 16 | 7.5 | 8 | 8.5 | 9 | 8 | 9 |
| 2 |  | 1 | 32 | 120 | 6.5 | 6 | 7.5 | 8 | 8 | 9 |
| 2 |  | 2 | 33 | 90 | 7 | 7 | 8 | 8.5 | 8 | 9 |
| 2 |  | 3 | 34 | 90 | 8 | 8 | 8 | 9 | 8 | 9 |
| C | +540 ppm MTBHQ | 1 | No cure |  |  |  |  |  |  |  |
| C | +540 ppm MTBHQ | 2 | 39.5 | 90 | 6.5 | 6.5 | 7.5 | 8.5 | 8 | 9 |
| C | +540 ppm MTBHQ | 3 | 25.5 | 90 | 7.5 | 8 | 8 | 9 | 8 | 9 |
| 1 |  | 1 | 15.5 | 60 | 7 | 8 | 8 | 8.5 | 8 | 9 |
| 1 |  | 2 | 13.5 | 40 | 7.5 | 8 | 8 | 9 | 8 | 9 |
| 1 |  | 3 | 13.5 | 40 | 7.5 | 8 | 8 | 9 | 8 | 9 |

TABLE 3-continued

Application performance with comparative composition (C) and new catalyst
compositions (Examples 1 and 2) at 20° C. at 32% relative humidity (RH) on hot dipped
galvanized steel for various total weight percentages of catalyst compositions are provided.
"Surf" denotes surface and "Adh" denotes adhesion in the following tables.

| Ex. | Additives relative to Comp. Ex. (C) | Amnt. of Catalyst (%) | Work Time (min) | Dry to sand (min) | Sand Quality on Surf. | Surface Clogging | Sand Quali. Below Surf. | Clog Below Surf. | Feather edge | Adh. |
|---|---|---|---|---|---|---|---|---|---|---|
| C | +220 ppm MTBHQ | 1 | 35 | 100 | 6.5 | 6.5 | 8 | 8 | 8 | 9 |
| C | +220 ppm MTBHQ | 2 | 14.5 | 42 | 7 | 8 | 8 | 8.5 | 8 | 9 |
| C | +220 ppm MTBHQ | 3 | 11.5 | 25 | 7 | 7.5 | 8 | 8 | 8 | 9 |

The beneficial effects of an inhibitor mixed into conventional B50 are noted. The performance numbers are on scale 1-10, where 1 is very poor and 10 is excellent.

TABLE 4 with comparative composition (C) and new catalyst compositions (Example 2)
on hot dipped galvanized steel at 35° C. at 35% relative humidity (RH) on hot dipped
galvanized steel for various total weight percentages of catalyst compositions are provided.

| Ex. | Amnt. of Catalyst (%) | Work Time (min) | Dry to sand (min) | Sand Quality on Surf. | Surface Clogging | Sand Quali. Below Surf. | Clog Below Surface | Feather edge | Adh. |
|---|---|---|---|---|---|---|---|---|---|
| 2 | 1 | 14.5 | 45 | 7.5 | 7.5 | 8.5 | 8 | 8 | 9 |
| 2 | 2 | 16 | 60 | 7.5 | 8.5 | 8.5 | 8.5 | 8 | 9 |
| C | 1 | 16 | No cure | | | | | | |
| C | 2 | 17.5 | 60 | 7.5 | 8.5 | 8.5 | 8.5 | 7.5 | 9 |

Examples 6 and 7

A conventional BPO paste is provided as a based material and denoted in Table 5 as a comparative example composition. To the comparative composition is added 4 to 5 total weight percent of 25 weight percent MTBHQ solution in polypropylene glycol to form an inventive catalyst composition with a work time of 8 to 12 minutes (Example 6). By adding 10 to 11 total weight percent of 25 weight percent MTBHQ solution in polypropylene glycol to form an inventive catalyst composition with a work time of 30 to 35 minutes (Example 7).

TABLE 5

Comparative catalyst composition and
modifications thereof for Examples 6 and 7.

| Component, weight % | Comparative | Ex. 6 | Ex. 7 |
|---|---|---|---|
| Benzoyl peroxide | 50 | 50 | 50 |
| Water | Remainder | Remainder | Remainder |
| Plasticizer | 15-20 | 15-17 | 14-16 |
| Zn stearate | 1-5 | 1-5 | 1-5 |
| Fumed silica | 1-5 | 1-5 | 1-5 |
| 25% MTBHQ solution in polypropylene glycol | 0 | 4-5 | 10-11 |

Examples 8 and 9

The compositions of Examples 6 (Example 8) and 7 (Example 9) are reproduced with equal the MTBHQ amounts being halved and replaced with like amounts of BHT. Similar properties are observed as to work time Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A free radical cure catalyst composition comprising:
   a free radical cure catalyst present as a paste at 20° C.; and
   a cure inhibitor dissolved in a solvent compatible with said free radical cure catalyst to form an inhibitor solution, said inhibitor solution mixed with said paste.

2. The composition of claim 1 wherein said free radical cure catalyst is a dibenzoyl peroxide.

3. The composition of claim 1 wherein said free radical cure catalyst is a diacylperoxide, a hydroperoxide, a ketone peroxide, a peroxyester, a peroxyketals, a dialkyl peroxide, an alkyl perester, or a percarbonate.

4. The composition of claim 1 wherein said free radical cure catalyst is an azo-group containing catalyst.

5. The composition of claim 1 wherein said free radical cure catalyst is benzoyl peroxide or di(4-tert-butylcyclohexyl)peroxydicarbonate.

6. The composition of claim 1 further comprising an aqueous slurry comprising a plasticizer, a stearate, fumed silica, or a combination thereof.

7. The composition of claim 6 wherein said free radical cure catalyst is present from 45 to 70 total weight percent of a combination of said free radical cure catalyst and said aqueous slurry.

8. The composition of claim 1 wherein said cure inhibitor is one or more of mono-tert-butylhydroquinone (MTBHQ), 2,5-di-tert-butylhydroquinone (DTBHQ), butylated hydroxytoluene (BHT), or toluhydroquinone (THQ).

9. The composition of claim 1 wherein said cure inhibitor is one or more of trimethyl hydroquinone (TMHQ), butylated hydroxyanisole (BHA), 4-methoxyphenol (MEHQ), hydroxyamines, benzofuranone derivatives, or vitamin E.

10. The composition of claim 1 wherein said cure inhibitor is present from 0.5 to 5 total weight percent.

11. A filler composition comprising:
    an ethylenically unsaturated resin;
    a crosslinking agent; and
    free radical cure catalyst composition comprising: a free radical cure catalyst present as a paste at 20° C. and a cure inhibitor dissolved in a solvent compatible with said free radical cure catalyst to form an inhibitor solution, said inhibitor solution mixed with said paste.

12. The filler composition of claim 11 further comprising a cure promoter or a particulate filler.

13. The composition of claim 11 further comprising at least one additive of an adhesion promoter, a flow control additive, a pigment, a dye, or combinations of any of the aforementioned.

14. The composition of claim 11 wherein said free radical cure catalyst is at least one of: a dibenzoyl peroxide, benzoyl peroxide, or di(4-tert-butylcyclohexyl)peroxydicarbonate.

15. The composition of claim 11 wherein said cure inhibitor is one or more of mono-tert-butylhydroquinone (MTBHQ), 2,5-di-tert-butylhydroquinone (DTBHQ), butylated hydroxytoluene (BHT), toluhydroquinone (THQ), trimethyl hydroquinone (TMHQ), butylated hydroxyanisole (BHA), 4-methoxyphenol (MEHQ), hydroxyamines, benzofuranone derivatives, or vitamin E.

16. The composition of claim 11 wherein said free radical cure catalyst is a diacylperoxide, a hydroperoxide, a ketone peroxide, a peroxyester, a peroxyketals, a dialkyl peroxide, an alkyl perester, or a percarbonate.

17. The composition of claim 11 wherein said cure inhibitor is present from 200 to 800 parts per million in a fully formulated repair composition.

18. A method of repairing a vehicle body comprising:
    applying an uncured layer of the composition according to claim 11 to a substrate;
    modifying the uncured layer during a working time of from 8 to 35 minutes; and
    allowing the uncured layer to cure under free radical conditions to form a cured layer.

19. The method of claim 18 wherein the substrate is a vehicle body.

20. The method of claim 19 further comprising sanding said cured layer.

* * * * *